(12) United States Patent
Amado Muñoz

(10) Patent No.: US 12,576,380 B2
(45) Date of Patent: Mar. 17, 2026

(54) ENVIRONMENTALLY FRIENDLY MICROCAPSULES AND A METHOD FOR THE PRODUCTION THEREOF

(71) Applicant: Follmann GmbH & Co. KG, Minden (DE)

(72) Inventor: Raúl Amado Muñoz, Porta Westfalica (DE)

(73) Assignee: Follmann GmbH & Co. KG, Minden (DE)

( * ) Notice: Subject to any disclaimer, the term of this patent is extended or adjusted under 35 U.S.C. 154(b) by 783 days.

(21) Appl. No.: 17/644,891

(22) Filed: Dec. 17, 2021

(65) Prior Publication Data

US 2023/0040439 A1 Feb. 9, 2023

(30) Foreign Application Priority Data

Jul. 23, 2021 (EP) ..................................... 21187524

(51) Int. Cl.
| | |
|---|---|
| *B01J 13/10* | (2006.01) |
| *B01J 13/02* | (2006.01) |
| *B01J 13/14* | (2006.01) |
| *C11D 3/00* | (2006.01) |
| *C11D 3/22* | (2006.01) |
| *C11D 3/50* | (2006.01) |
| *C11D 17/00* | (2006.01) |

(52) U.S. Cl.
CPC .............. *B01J 13/10* (2013.01); *B01J 13/02* (2013.01); *B01J 13/14* (2013.01); *C11D 3/001* (2013.01); *C11D 3/225* (2013.01); *C11D 3/227* (2013.01); *C11D 3/505* (2013.01); *C11D 17/0039* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 2019/0062676 A1* | 2/2019 | Ott | A61K 8/8129 |
| 2022/0008886 A1* | 1/2022 | Lei | A61Q 13/00 |
| 2024/0327757 A1 | 10/2024 | Amado Munoz | |

FOREIGN PATENT DOCUMENTS

| | | |
|---|---|---|
| CN | 102847495 A | 1/2013 |
| WO | 2008/017962 A2 | 2/2008 |
| WO | 2008/085997 A2 | 7/2008 |
| WO | 2021/239742 A1 | 12/2021 |

OTHER PUBLICATIONS

International Search Report and Written Opinion of the International Searching Authority dated Oct. 25, 2022 in International Application No. PCT/EP2022/070650.
Database WPI, CN102847495 (Guangzhou Aoyi Electronic Sci & Technolo), Jan. 2, 2013, Abstract (2 pages total).
International Preliminary Report on Patentability in International Application No. PCT/EP2022/070650, issued on Sep. 6, 2023.
Database WPI Week 201355, XP002805203, Thomson Scientific, London, GB; AN 2013-H54180, 2013 (2 pages total).

* cited by examiner

*Primary Examiner* — Jeffrey D Washville
(74) *Attorney, Agent, or Firm* — Sughrue Mion, PLLC

(57) ABSTRACT
The present invention is directed to a method for producing advantageous microcapsules. Moreover, the present invention provides microcapsules obtained/obtainable by the method according to the invention.

22 Claims, 10 Drawing Sheets

ENVIRONMENTALLY FRIENDLY MICROCAPSULES AND A METHOD FOR THE PRODUCTION THEREOF

The present invention pertains to a method for producing environmentally friendly microcapsules, in particular microcapsules comprising a core material and a shell, microcapsules produced therewith as well as their uses and compositions comprising them.

Microcapsules allow the manufacture of products and applications with added value in all parts of industries including healthcare and personal care products, agriculture, material science and construction. In homecare products, for example laundry products, microcapsules are frequently used for achieving long lasting freshness, extending the scent of perfume oil or controlled release of the encapsulated substances (core material). Various mechanisms for a controlled release of the core material exist, for example mechanical stress, change of temperature or chemical impacts (pH shift, UV etc.).

Many core-shell microcapsules, in particular microcapsules with high stability, have shells containing non-biodegradable resins, such as melamine-formaldehyde resins, urea-formaldehyde resins or phenol-formaldehyde resins. Such microcapsules contribute to the environmental burden of microplastic. Microplastic particles are critical, since they endanger the ecosystem on a long-term basis, including impacts on human health.

It is thus an objective of the present invention to provide microcapsules with advantageous properties in terms of mechanical and/or chemical stability. Preferably, these microcapsules are also environmentally friendly.

SUMMARY OF THE INVENTION

This problem is solved by a method according to claim 1 and the microcapsules produced thereby, as well as by microcapsules defined by the independent claims. Particularly advantageous embodiments of the invention are subject matter of the depended or any further independent claims.

The method according to the invention leads to environmentally friendly microcapsules of high quality in particular in terms of stability and impermeability. They do not necessarily require the use of synthetic resin in order to be sufficiently impermeable and stable for various industrial uses, including in particular the use in washing and cleaning products. Preferably, the shell of the microcapsules according to the invention is produced without the use of non-biodegradable polyelectrolytes. Most preferred all polyelectrolytes are biodegradable. Advantageously, the microcapsules allow a long lasting and controlled release of the core material comprised therein. This makes them particularly suitable for the use in washing and cleaning products.

The inventors have found that by adding a core material, which is preferably a hydrophobic material, to a composition (preferably an aqueous composition) comprising at least one solubilised polyelectrolyte A and at least one crosslinking agent (steps a and b), and in a next step, adding a solubilised polyelectrolyte B to the composition (step e), then fostering the polyelectrolytes to form a coacervate (step f) leads to microcapsules of high mechanical and chemical strength and durability.

The polyelectrolyte A preferably is anionic. In step a) it is preferably gum arabic.

The composition in step a) can further comprise an agent (thickener) to increase the viscosity of the composition. This can serve to stabilise the emulsion obtained in step b). Preferably the thickener is a polyelectrolyte, more preferably an anionic polyelectrolyte, most preferably it is a modified cellulose, in particular carboxymethyl cellulose.

Both, the polyelectrolytes of step a) and the polyelectrolyte of step c), preferably belong to the same group of polyelectrolytes, which preferably is defined as anionic (A). The polyelectrolyte B, added in step e) preferably is cationic or amphoteric. Most preferred polyelectrolyte B is chitosan.

In a particularly preferred embodiment, a composition comprising gum arabic is provided in step a), gum arabic is added in step c) and in step e) chitosan as polyelectrolyte B is used.

In yet a further particularly preferred embodiment of the invention the composition obtained through steps a) to c) is cooled before the polyelectrolyte B is added in step e). Such a regime favours the formation of a complex coacervate over uncontrolled crosslinking.

The degree of crosslinking can be increased, when the composition of step f) is heated. This further improves the resulting microcapsules in terms of stability and impermeability. In embodiments in which chitosan is selected for step e) it was found, that agglomeration can be reduced by the addition of at least one agglomeration inhibiting agent in step f). A particularly preferred agglomeration inhibiting agent is gum arabic.

In one particularly preferred embodiment of the invention, the crosslinking agent is an aldehyde, preferably a dialdehyde; most preferred is a crosslinking agent, which is the reaction product of a dialdehyde and an aromatic alcohol, in particular from the group of phenols, such as phenol or resorcinol. It was surprisingly found by the inventors that crosslinking the polyelectrolytes with such reaction products leads to particularly advantageous microcapsules in terms of chemical and/or mechanical stability.

The reaction product of the dialdehyde and the aromatic alcohol can be formed in situ. In a preferred embodiment of the invention, the composition comprising at least one polyelectrolyte A in step a) further comprises the aromatic alcohol before the aldehyde is added. Hence, in this embodiment, at first a composition is provided comprising at least one polyelectrolyte A and at least one aromatic alcohol, and then the dialdehyde is added. However, it is also possible to provide the reaction product separately and then to add this to the composition comprising polyelectrolyte A.

It was found that the permeability of the microcapsule advantageously can be controlled either by the temperature profile of the production method and/or by the weight ratio of polyelectrolytes added in step a) and step c) and/or the weight ratio of the polyelectrolytes to the crosslinking agent. Approximately equal amounts of the polyelectrolyte and the crosslinking agent in step a) are particularly preferable.

In a most preferred embodiment, the weight ratio between the polyelectrolyte and crosslinking agent in step a) is between 2:3 and 3:2. Advantageously, in step c) the polyelectrolyte is added in excess to the amount of polyelectrolyte in step a). In a most preferred embodiment, the weight ratio between the polyelectrolyte in the composition in step a) to the polyelectrolyte added in step c) lies between 1:4 and 1:7.

Furthermore, small microcapsules with a size of d(90%) <50 μm (measured in deionized water at room temperature by DLS) are obtained/obtainable according to one embodiment of the invention. It is preferred, that the mixing intensity, especially by stirring, is adjusted in the step of emulsifying/suspending a core material (in step b). More preferred is that the mixing intensity, e.g. stirring speed is increased. The mixing intensity, e.g. speed of stirring can be increased to a point where the formed emulsion has a droplet size which is desired to be encapsulated by a crosslinked polyelectrolyte. A skilled person in the art is aware of the fact that the needed mixing intensity is also dependent on the reaction vessel/container (volume and geometry). Stirring speeds (in rpm) mentioned herein are always based on a 1-liter batch size. For larger batches, the mixing intensities, e.g. stirring speeds are adjusted according to the used vessel volume and/or geometry. It is further preferred that the mixing intensity, e.g. stirring speed is reduced after the emulsification/suspending in step b) and before the addition of further polyelectrolyte in step c). This enables also capsules of a size of below 25 μm d(90%).

The microcapsules (abbreviated to capsules) according to the invention comprise a core material. The chemical nature and structure thereof are not specifically limited. It can be a single substance or a mixture of substances. A hydrophobic substance or a mixture of substances comprising at least one hydrophobic substance is preferred.

In one embodiment of the invention, the core material can comprise solid particle/s. According to a method of the invention it is therefore possible to encapsulate solid particle/s. The solid particles themselves have no core-shell structure. The solid particle/s can be encapsulated in addition to further core materials. They can comprise a resin, a biopolymer and/or a zeolite. The material of the solid particles is not limited. Preferably the solid particles are porous.

In a particular advantage of the invention environmentally friendly microcapsules are provided, in particular the microcapsules are advantageous in terms of their biodegradability. Biodegradability in the context of plastics is understood as the microbial conversion of its organic constituents to carbon dioxide, new microbial biomass and mineral salts under oxic conditions, or to carbon dioxide, methane, new microbial biomass and mineral salts, under anoxic conditions (SAPEA, Science Advice for Policy by European Academies. (2020); Biodegradability of plastics in the open environment. Berlin: SAPEA, version 1.2, p. 34).

Biodegradability can be quantified according to method described in the OECD Guideline 301 "Ready Biodegradability" (OECD (1992), Test No. 301: Ready Biodegradability, OECD Guidelines for the Testing of Chemicals, Section 3, OECD Publishing, Paris, https://doi.org/10.1787/9789264070349-en). OECD test 301 B (modified Sturm test) is used for substances with a low solubility in water and the $CO_2$ evolution of the material is analysed by respirometry.

According to a preferred embodiment of the invention, the shell of the microcapsules is composed of essentially biodegradable materials, preferably it is produced with bio-based polymers. In a preferred embodiment, the biodegradability of the shell measured according to the method described in OECD 301 B within 60 days is at least 30%, at least 40%, preferably at least 50%, more preferably at least 60%, most preferably at least 70%. In a particularly preferred embodiment of the invention the biodegradability is at least 60% measured according to the method in said OECD guideline within 60 days.

Other objects, features, advantages and aspects of the present application will become apparent to those skilled in the art from the following description and appended claims. It should be understood, however, that the following description, appended claims, and specific examples, while indicating preferred embodiments of the application, are given by way of illustration only.

DETAILED DESCRIPTION OF THE INVENTION

Figure 1:
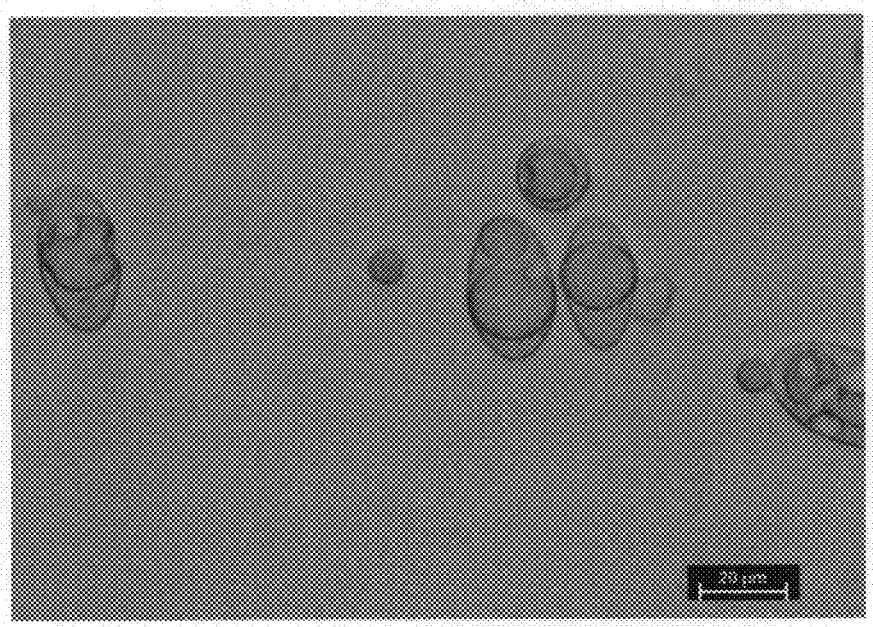
FIG. 1 is a microscopic image of microcapsules produced by a method according to the invention; shown here are microcapsules with a very low degree of crosslinking wherein only a dialdehyde was used as crosslinking agent, encapsulating dodecane.
Figure 2:
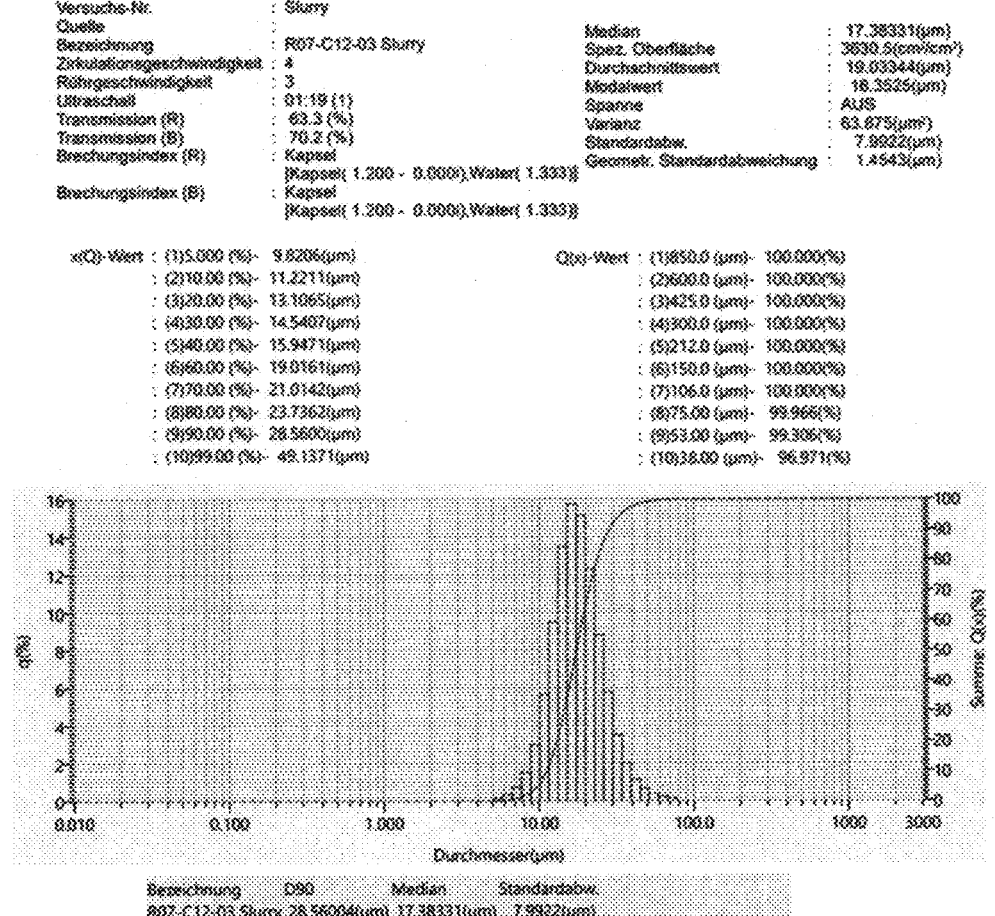
FIG. 2 is an overview of a DLS measurement and setup from microcapsules shown in FIG. 1.
Figure 3:
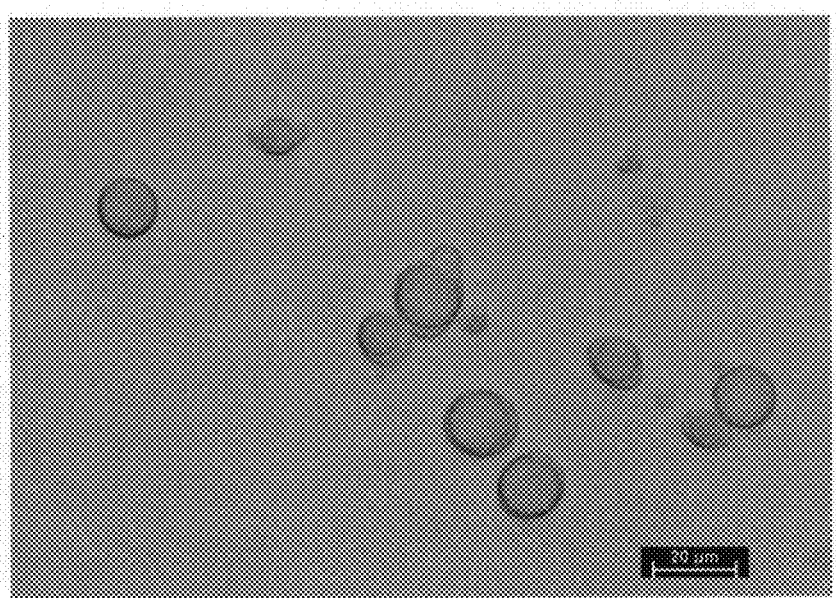
FIG. 3 is a microscopic image of microcapsules produced by a method according to the invention; shown here are microcapsules with a low degree of crosslinking wherein an aromatic alcohol and a dialdehyde were used as crosslinking agent, encapsulating dodecane.
Figure 4:
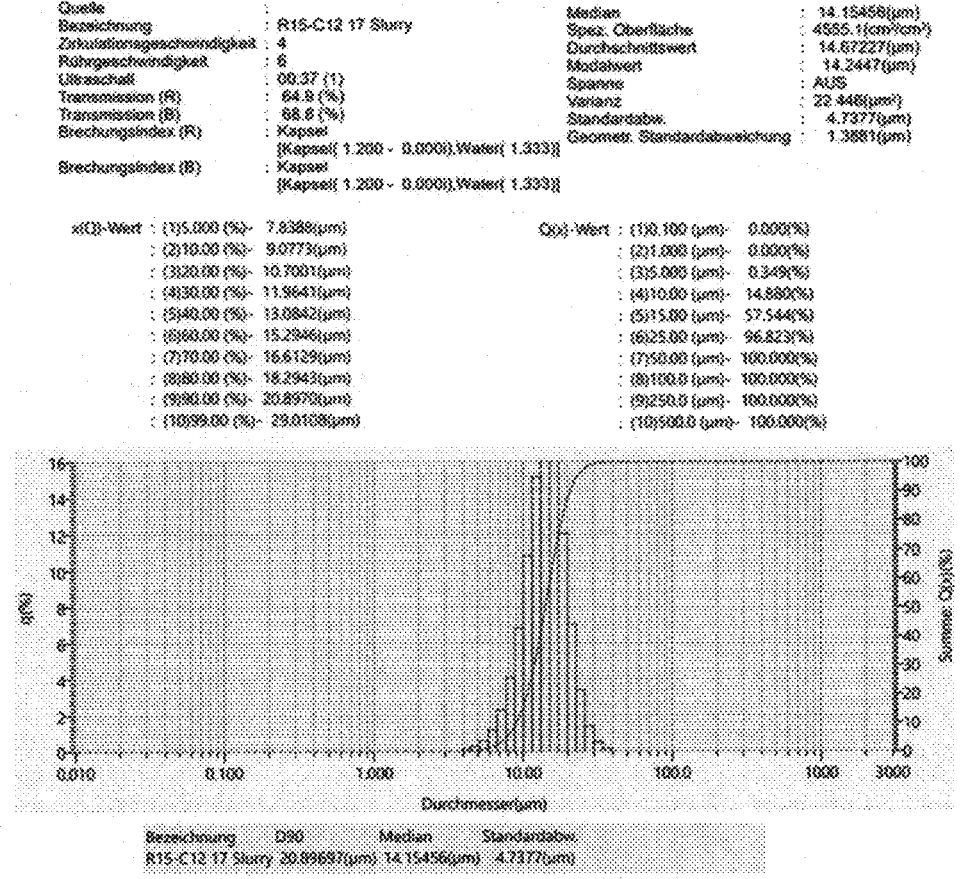
FIG. 4 is an overview of a DLS measurement and setup from microcapsules shown in FIG. 3.
Figure 5:
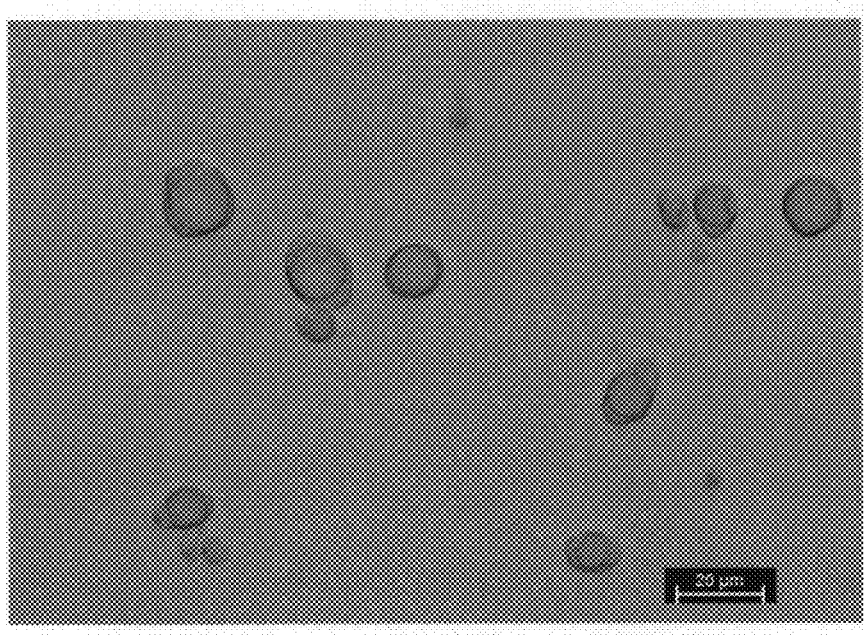
FIG. 5 is a microscopic image of microcapsules produced by a method according to the invention; shown here are microcapsules with a medium degree of crosslinking wherein an aromatic alcohol and a dialdehyde were used as crosslinking agent, encapsulating dodecane.
Figure 6:
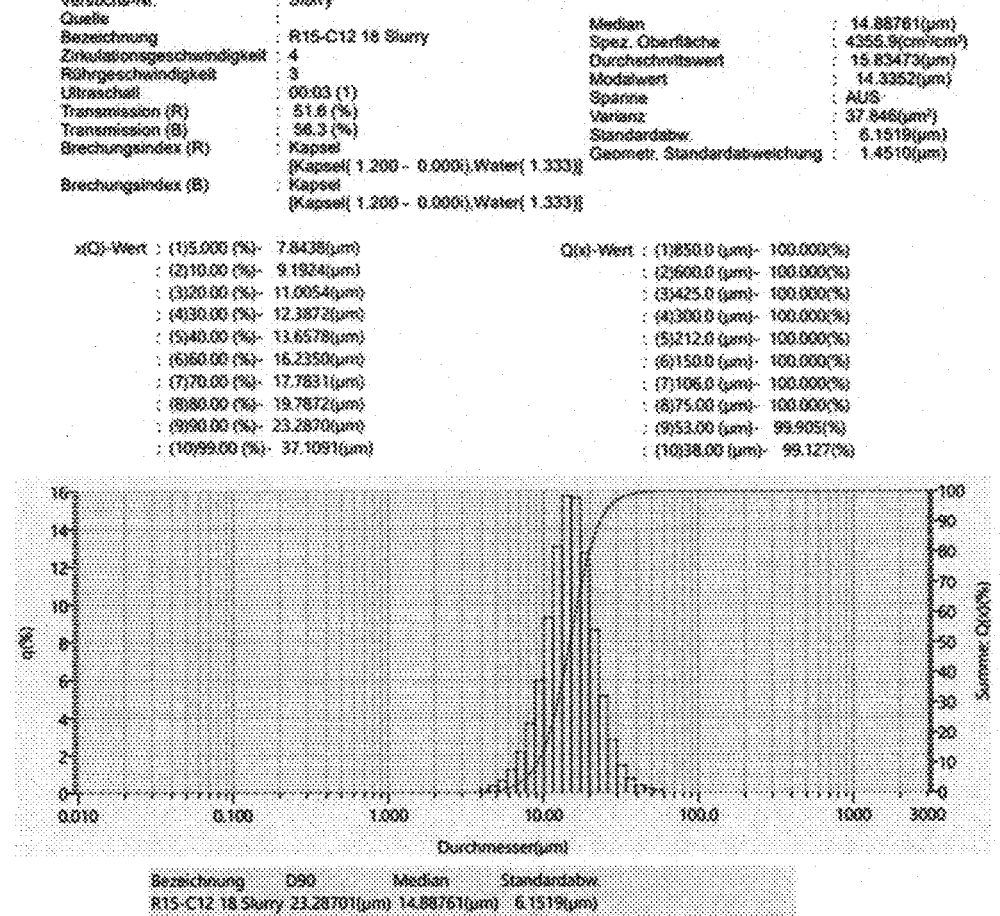
FIG. 6 is an overview of a DLS measurement and setup from microcapsules shown in FIG. 5.
Figure 7:
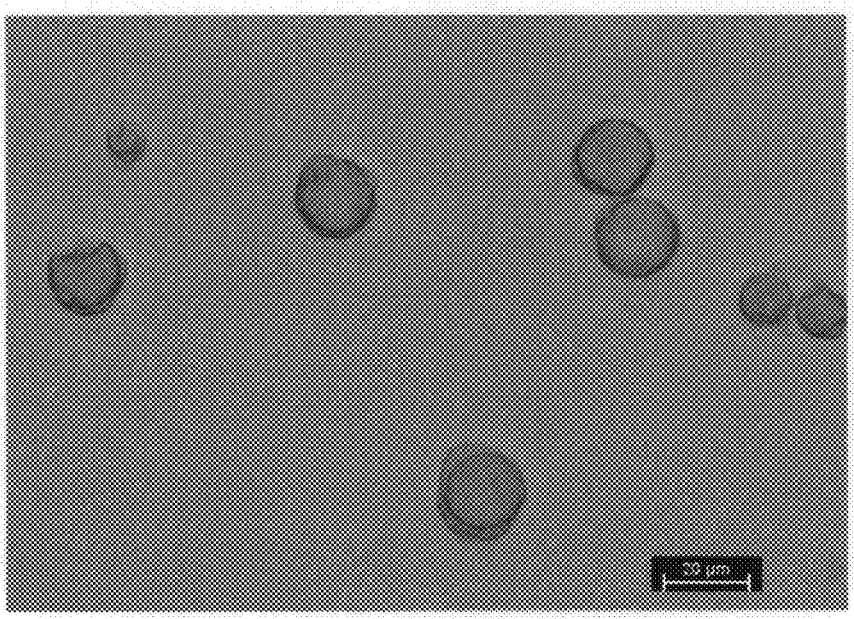
FIG. 7 is a microscopic image of microcapsules produced by a method according to the invention; shown here are microcapsules with a high degree of crosslinking wherein an aromatic alcohol and a dialdehyde were used as crosslinking agent, encapsulating dodecane.
Figure 8:
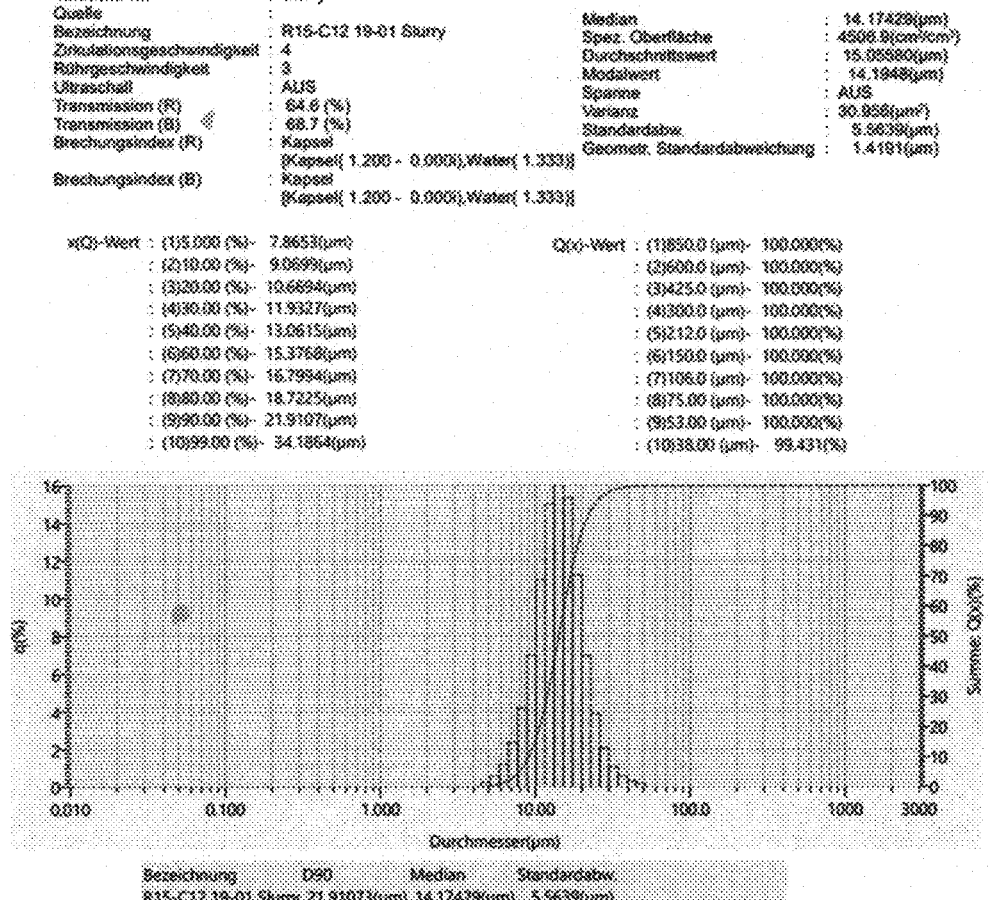
FIG. 8 is an overview of a DLS measurement and setup from microcapsules shown in FIG. 7.
Figure 9:
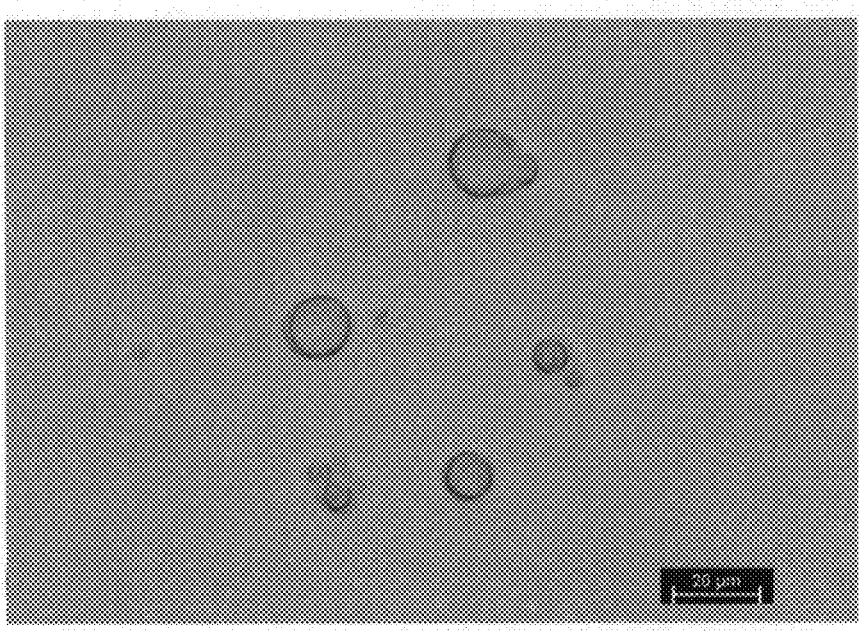
FIG. 9 is a microscopic image of microcapsules produced by a method according to the invention; shown here are microcapsules with a low degree of crosslinking wherein an aromatic alcohol and a dialdehyde were used as crosslinking agent, encapsulating a fragrance oil.
Figure 10:
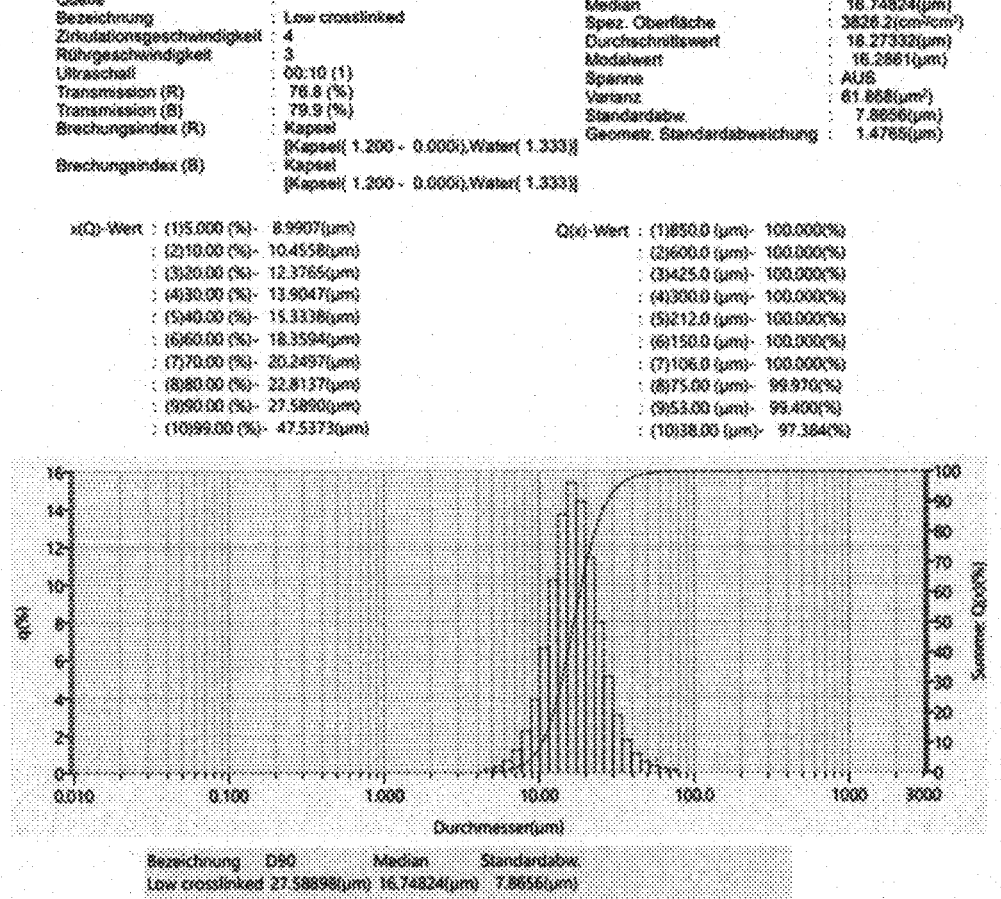
FIG. 10 is an overview of a DLS measurement and setup from microcapsules shown in FIG. 9.
Figure 11:
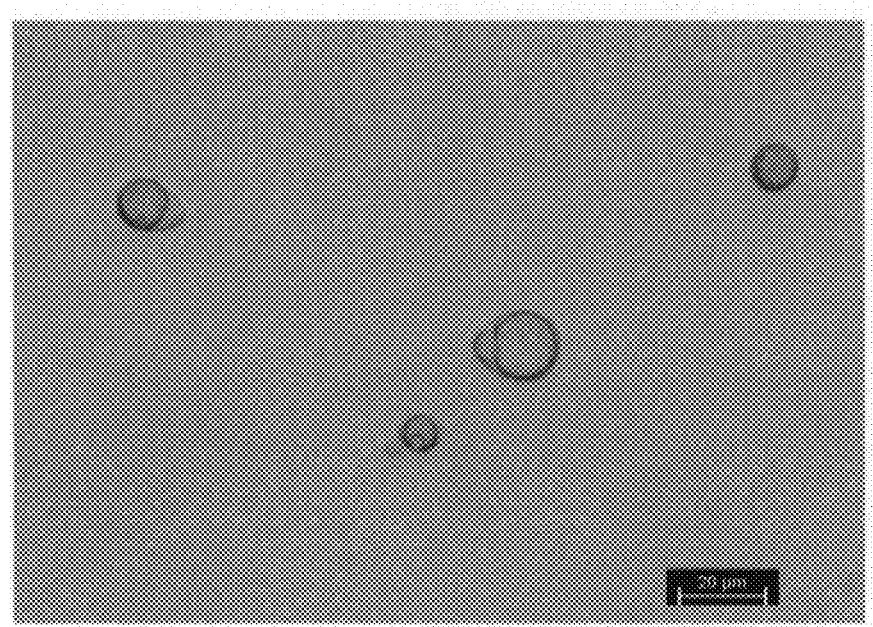
FIG. 11 is a microscopic image of microcapsules produced by a method according to the invention; shown here are microcapsules with a medium degree of crosslinking wherein an aromatic alcohol and a dialdehyde were used as crosslinking agent, encapsulating a fragrance oil.
Figure 12:
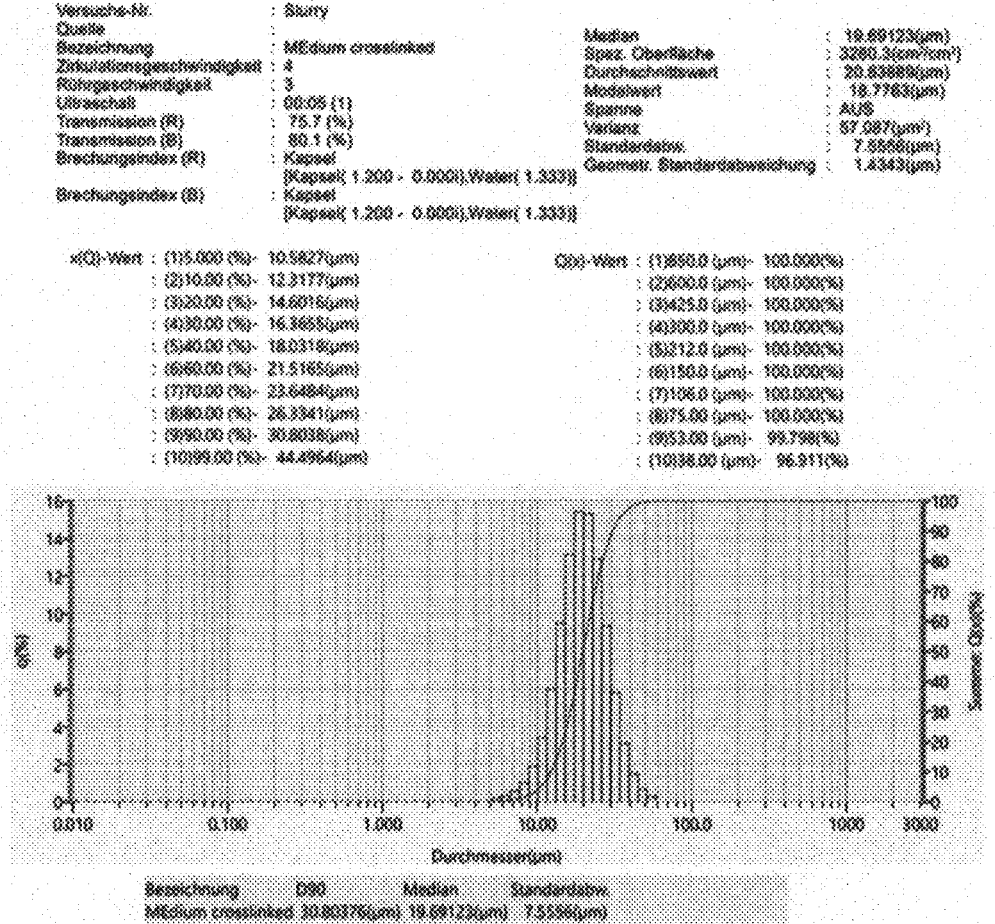
FIG. 12 is an overview of a DLS measurement and setup from microcapsules shown in FIG. 11.
Figure 13:
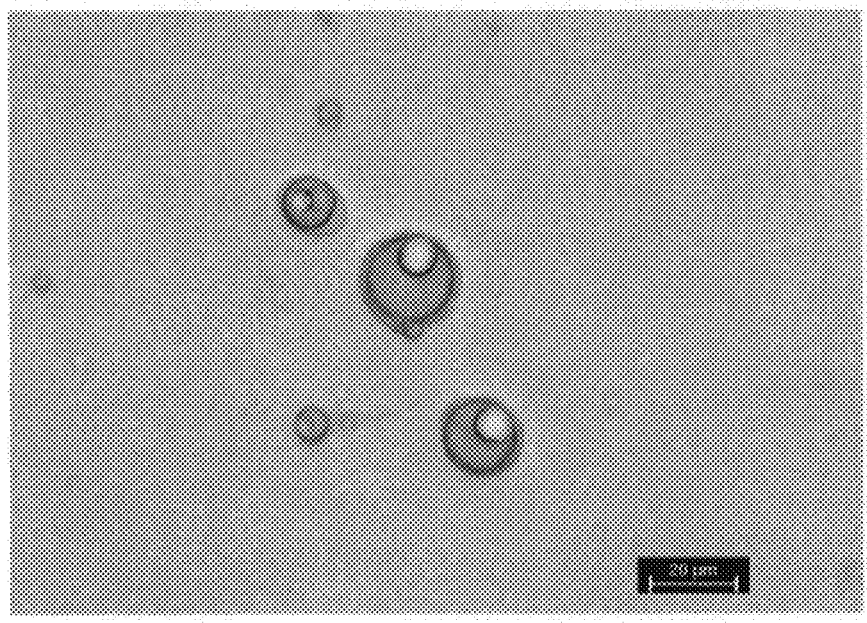
FIG. 13 is a microscopic image of microcapsules produced by a method according to the invention; shown here are microcapsules with a high degree of crosslinking wherein an aromatic alcohol and a dialdehyde were used as crosslinking agent, encapsulating a fragrance oil.
Figure 14:
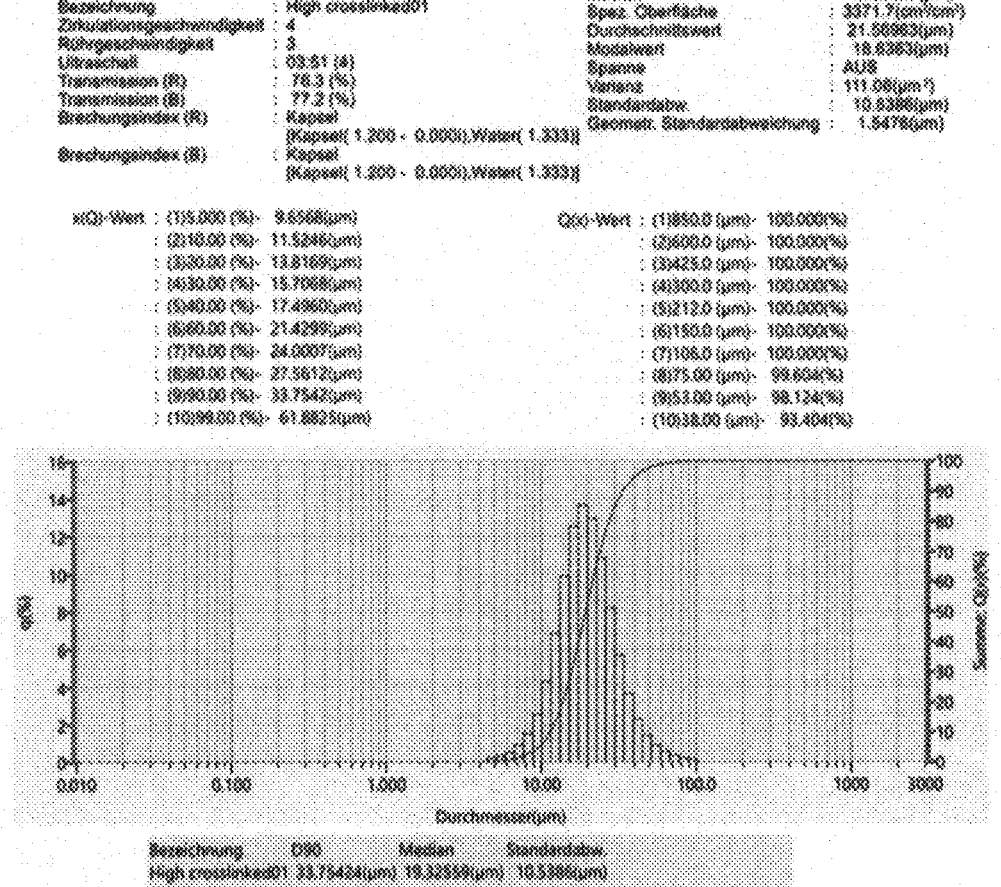
FIG. 14 is an overview of a DLS measurement and setup from microcapsules shown in FIG. 13.

The present invention provides an improved method for producing environmentally friendly microcapsules. Moreover, the present invention provides microcapsules obtainable by the method according to the invention, in particular microcapsules which are suitable for all kinds of industrial application, in particular in personal care and home care products. The microcapsule preferably comprises at least one oil as core material.

According to the invention a method is provided for producing microcapsules comprising a core material and a shell comprising the following steps,
   a) adding at least one crosslinking agent to a composition comprising at least one first solubilised polyelectrolyte (polyelectrolyte A),
   b) adding the core material,
   c) optionally adding at least one further solubilised polyelectrolyte A,
   d) optionally cooling the composition,
   e) adding at least one second solubilised polyelectrolyte (polyelectrolyte B),
   f) fostering a coacervation of the polyelectrolytes.

"Polyelectrolytes" according to the invention are polymers whose repeating units bear an electrolyte group. Polycations and polyanions are polyelectrolytes. These groups dissociate in aqueous solutions (water), making the polymers charged. Polyelectrolyte properties are thus similar to both electrolytes (salts) and polymers (high molecular weight compounds) and are sometimes called polysalts. Like salts, their solutions are electrically conductive. Like polymers, their solutions are often viscous. They can be classified as cationic, anionic, and amphoteric according to the nature of the functional groups along the polymer chain.

The polyelectrolytes used for forming the shell of the microcapsules according to the invention preferably is selected from the group of biodegradable polymers. As mentioned above, biodegradability is understood as the microbial conversion of the constituents of a material to carbon dioxide, new microbial biomass and mineral salts under oxic conditions, or to carbon dioxide, methane, new microbial biomass and mineral salts, under anoxic conditions.

In a preferred embodiment, the biodegradability of the polymer within 60 days measured according to OECD 301 B is at least 30%, at least 40%, preferably at least 50%, more preferably at least 60%, even more preferably at least 70%. It is most preferred that the polymer has a biodegradability of 90% or more within 60 days measured according to OECD 301 B.

Advantageously biodegradable polymers are selected from the group of bio-based polymers. "Bio-based polymers" are composed of or derived from, in whole or in part, from biomass (including plant, animal, and marine or forestry materials). Bio-based polymers can be subdivided in naturally occurring polymers, bio-derived polymers, and synthetic polymers built from renewable (non-fossil) sources.

Preferred bio-based polymers according to the invention are selected from the group consisting of collagen, silk fibroin, gelatin, starch, cellulose (including modified forms thereof, such as carboxymethyl cellulose), alginate, gum arabic and chitosan. Most preferred are cellulose (including modified forms thereof), gum arabic and chitosan or mixtures thereof.

Naturally occurring polymers are preferably selected from the group consisting of gum arabic, agar-agar, agarose, maltodextrins, tannins, alginic acid or its salts, e.g. sodium or calcium alginate, fats and fatty acids, cetyl alcohol, collagen, chitosan, lecithin, gelatin, albumin, shellac, polysaccharides such as starch or dextran, polypeptides, protein hydrolysates, sucrose and waxes or mixtures thereof. Most preferred are gum arabic and chitosan.

Preferred bio-derived polymers are selected from the group consisting of chemically modified celluloses, especially cellulose esters and ethers of cellulose, e.g. cellulose acetate, ethyl cellulose, hydroxypropyl cellulose, hydroxypropyl methyl cellulose and carboxymethyl cellulose, as well as starch derivatives, especially starch ethers and esters or mixtures thereof. Most preferred is carboxymethyl cellulose.

As outlined above, the method according to the invention comprises the use of polyelectrolytes A and B. The polyelectrolytes A preferably are anionic polyelectrolytes, whereas the polyelectrolytes B are cationic or amphoteric.

According to a preferred embodiment of the invention polyelectrolyte A is selected from the group consisting of gum arabic, sodium carboxymethyl guar gum, plant gums, pectin, glycogen, cellulose (in particular carboxymethyl cellulose), alginate, starch (e.g. amylose or amylopectin), hyaluronic acid, tannins, carrageenan, lignin sulfonate or xanthan gum or mixtures thereof, preferably gum arabic, pectin, carboxymethyl cellulose, or gum arabic and carboxymethyl cellulose.

Preferably, polyelectrolyte B is selected from the group consisting of chitosan, gelatin, casein, plant proteins (e.g. soy protein isolate), egg white protein, chitin, or silk protein or mixtures thereof, is preferably chitosan, gelatin or soy protein isolate, most preferred is chitosan.

Chitosan is a linear polysaccharide (and polyelectrolyte) composed of randomly distributed β-(1→4)-linked D-glucosamine (deacetylated unit, GlcN) and N-acetyl-D-glucosamine (acetylated unit, GlcNAc). Chitosan is produced commercially by deacetylation of chitin. Chitosan may have different degrees of deacetylation. Due to the free amino groups formed by deacetylation, it is a polycation with a high charge density in non-alkaline solution. The ratio of both monomers (Glcn and GlcNAc) to each other is described by the degree of deacetylation $D_{deac}$. If there is no explicit indication of the degree of deacetylation, "chitosan" of any degree of deacetylation is understood.

Chitosan, preferably being used in the present invention has an average molecular weight comprised from 10 to 90 kDa, more preferably from 15 to 80 kDa. It can have a degree deacetylation of greater than or equal to 70 by mol %, relative to the wet weight. In one preferred embodiment of the invention chitosan has a degree of deacetylation greater 70 mol %, preferred of greater than or equal to 95 mol %.

In one embodiment the used chitosan has a degree of deacetylation of above 70 mol % and a molecular weight from 15 to 80 kDa.

In particularly preferred embodiments of the invention the polyelectrolyte A in step a) comprises gum arabic. In a further embodiment the polyelectrolyte A in step c) is gum arabic. In a preferred embodiment the polyelectrolyte in step e) is chitosan.

In the most preferred embodiment of the invention the polyelectrolyte A in step a) is gum arabic, the polyelectrolyte A in step c) is also gum arabic, and the polyelectrolyte B in step e) is chitosan.

According to the invention, a crosslinking agent is added in step a). The crosslinking agent preferably is an agent with an aldehyde group (aldehyde), preferably with at least two aldehyde groups (dialdehyde), most preferred selected from the group consisting of succindialdehyde, adipaldehyde, glutaraldehyde, glyoxal, glyoxylic acid, malondialdehyde, oleocanthal or mixtures thereof, preferably glutaraldehyde. The aldehyde can be in monomeric, dimeric, oligomeric, polymeric form or mixtures thereof. For example, glyoxylic acid that has one aldehyde group, can form a hemiacetal dimer. Glutaraldehyde is known to convert into various hydrates, such as cyclic and/or oligomeric hydrates.

In particularly preferred embodiments the crosslinking agent is a reaction product from a dialdehyde and an aromatic alcohol. This leads to superior stability and/or impermeability. Preferred aromatic alcohols are selected from the group phenols, such as phenol, cresol (o-, m-, p-cresol), naphthol (1-, 2-naphthol), pyrocatechol, resorcinol, hydroquinone, 1,4-naphthohydroquinone, phloroglucinol, pyrogallol, hydroxyquinol, benzene-1,2,3,5-tetrol, or mixtures thereof. The reaction product can be form in situ in step a).

In particularly a particularly preferred embodiment the crosslinking agent is formed by reacting glutaraldehyde with phloroglucinol.

Preferably, the weight ratio of aromatic alcohol to dialdehyde is 1:0.5-1:20, preferably 1:1-1:10, most preferably 1:1-1:6.

The method according to the invention allows to provide microcapsules wherein the degree of crosslinking within the shell increases inwardly. This is supported by adding a smaller portion of polyelectrolyte A in step a) than in step c), and further facilitated by a gradual addition of the polyelectrolyte in step c). In an embodiment the ratio between polyelectrolytes respectively added in step a) and step c) is 1:1-1:30, preferably 1:2-1:15, more preferably 1:3-1:10, most preferably 1:4-1:7.

In a further embodiment the ratio between the amount of polyelectrolyte used in step a) to crosslinking agent is 1:8-8:1, preferably 1:5-5:1, more preferably 1:3-3:1, most preferably 2:3-3:2.

In a further embodiment the ratio between total amounts of polyelectrolytes to crosslinking agent is 1:1-50:1, preferably 2:1-25:1, more preferably 4:1-18:1, most preferably 6:1-13:1.

The term "coacervation" is known to the skilled person. It is generally understood as the separation of a one phase system in two phases of a colloidal system. According to the invention a complex coacervation is preferred. It is caused in the present context by the interaction of at least two oppositely charged polyelectrolytes.

According to a preferred embodiment of the invention, the coacervation in step f) is fostered, in particularly preferred by a change of pH. In general, a skilled person in the art knows how to determine the pH range of the desired coacervation of a system. In the context of the present invention it depends on the used polyelectrolytes, their quantities and proportions, as well as the reaction temperature. These specific pH ranges can be determined for example in turbidity studies. Conversely, therefrom it follows that, preferably, the pH of the compositions in step a) through e) each are kept in such a range that a coacervation, in particular a complex coacervation, is essentially avoided or at least substantially reduced. Complex coacervation can already occur in step e), but is fostered in step f).

According to the invention, the polyelectrolytes are added step-wise. During the course of the process, the forming microcapsule itself can become polycationic or polyanionic. The pH value of the respective composition preferably should thus be adapted in each step in order to facilitate sufficient solubility of polyelectrolytes which are about to be added. Particularly relevant is the deprotonation for poly-anions, protonation for polycations, or either for amphoteric polyelectrolytes.

In preferred embodiments of the invention, the pH value of the composition should be equal to or above ($\geq$) $pK_a$ value of the polyelectrolyte when a polyanion is added, or equal to or below ($\leq$) the $pK_a$ of the polyelectrolyte when a polycation is added.

In particularly preferred embodiments the polyelectrolyte in step a) and c) comprises gum arabic, and chitosan is used in step e), in step f) the pH values adjusted to the range of 2.2-5.0, preferably 2.8-4.4, most preferably 3.2-4.0.

Step b) of the method according to the invention are preferably performed under stirring. In a preferred embodiment the stirring speed in step b) is adjusted between 600 and 3000 rpm, preferably between 1000 and 2500 rpm and is reduced to 300 to 500 rpm before the addition of polyelectrolyte in step c) occurs. For step c) it is preferred to have a stirring speed between 300 to 500 rpm. The indicated stirring speeds herein refer to a 1 liter batch e.g. in a common laboratory dissolver. The person skilled in the art knows how to adjust the stirring speed according to the reaction vessel used (e.g. larger reaction vessel requires adapted stirring speeds).

In a particular preferred embodiment of the invention, the core material of the microcapsules comprises at least one hydrophobic substance or a mixture of various substances containing one or more hydrophobic substance. The hydrophobic substance is preferably selected from the group comprising alcohols, natural and/or synthetic oils, silicone oils, and/or the group comprising of fragrance oils, care substances, pesticides, biocides, pigments, phase change materials (PCM), fertilisers, adhesives, insecticides, solvents, lubricants, dyes, cooling substances, or mixtures thereof.

In a further embodiment of the method according to the invention the core material in step b) comprises at least one hydrophobic ingredient which is selected from the group consisting of alcohols, natural and/or synthetic oils, silicone oils, and/or the group consisting of fragrance oils, care substances, pesticides, biocides, pigments, phase change materials (PCM), fertilisers, adhesives, insecticides, solvents, lubricants, dyes, cooling substances, or mixtures thereof.

The temperature of step a) according to the invention is between room temperature and 80° C., preferably 30-75° C., more preferably 35-70° C., most preferably 50-65° C.

The temperature of step b) according to the invention is between room temperature and 80° C., preferably 30-75° C., more preferably 35-70° C., most preferably 50-65° C.

The temperature of step c) according to the invention is between room temperature and 80° C., preferably 30-75° C., more preferably 35-70° C., most preferably 50-65° C.

According to a particularly preferred embodiment, the temperature is kept at 50-65° C. in steps a) to c).

According to the invention the method can optionally feature step d) in which the composition is cooled. At low temperatures further crosslinking is suppressed, which is particularly preferred when amine—bearing polycations or amphoteric polyelectrolytes are added in the last step (step e) before coacervation. In these embodiments protonation of the amine groups is favoured over reaction with the aldehydic crosslinking agent. In a preferred embodiment of the invention step d) is executed and the temperature of the composition is 0-20° C., preferably 0-10° C., most preferably 5-10° C.

In a preferred embodiment of the invention the temperature of the composition in step e) is 0-20° C., preferably 0-10° C., most preferably 5-10° C.

In a preferred embodiment of the invention the temperature of the composition in step f) is 0-20° C., preferably 0-10° C., most preferably 5-10° C.

In a particularly preferred embodiment, the temperature of step d) is held during steps e) and f) at 5-10° C.

In a most preferred embodiment of the invention the temperature of the composition is 20-80° C. from step a) to step c), and 0-20° C. from step d) to step f).

In particularly preferred embodiments, the method features and additional step g) after step f), in which the composition is heated to maximise to crosslinking between the polyelectrolytes. In these embodiments the temperature of the composition in step g) is between 35 and 95° C., preferably 40-85° C., more preferably 45-75° C., most preferably 50-65° C.

Once the shell has been further crosslinked in step g), the microcapsule is not only more mechanically stable but also chemically stable. Hence the coacervate shell is affected less by changes in the pH value. In an embodiment of the invention the composition after step g) is adapted to a pH value of 6.0-7.8, preferably 6.3-7.5, most preferably 6.5-7.3.

According to the invention reaction times of steps in which crosslinking occurs need to be within certain time windows such that crosslinking can occur, but not too much crosslinking agent is used up. Preferably the reaction time is short enough for the polyelectrolyte added before step d) not to form a discrete shell with respect to the finished microcapsule. These reaction times are of course coupled to the temperatures of the individual steps.

In an embodiment of the invention the reaction time in step a) is less than 90 min, preferably less than 60 min, most preferably less than 30 min.

Upon adding the core material in step b) an emulsion is formed; this is typically within after 10 to 20 min. It was found that the chemical and/or mechanical properties of the microcapsules are improved when the composition in step b) is given a certain period of time to react before the next step is initiated. In preferred embodiments the composition in step b) is kept for 5-180 min, preferably 30-120 min, most preferably 55-95 min at the reaction temperature after the emulsion has formed, and before the next step is initiated.

The polyelectrolyte in step c) can be added all at once or over the course of the reaction time (or gradually as stated above). "Over the course of the reaction" time can mean both continuous or step-wise. Addition of the polyelectrolyte in step c) over the course of the reaction time leads to a higher crosslink density toward the inside of the shell. In preferred embodiments the reaction time of step c) is 5-90 min, preferably 15-60 min, most preferably 20-40 min.

Embodiments in which step g) is carried out, reaction times of step g) are preferably 5-420 min, more preferably 60-240 min, most preferably 90-150 min.

Typically, the microcapsules according to the invention have a hydrodynamic diameter d(90%) of between 1 μm and 5.000 μm, preferably between 5 μm and 1.000 μm, more preferably between 15 and 150 μm, even more preferably between 30 and 120 μm, most preferred between 10 and 50 μm, with a standard deviation of ±50% (measured via DLS in deionized water at room temperature, volume-weighted evaluation).

The size of the microcapsules according to the invention could be adjusted by the mixing intensity of the emulsion or dispersion, especially by stirring (depending on the rounds per minute, rpm) during step b). Furthermore varying the viscosity of dispersed and/or continuous phase may be suitable to adjust the size of the microcapsules.

The ratio of core material to total shell of a capsule obtained with the method according to the invention is preferably between 1:10 and 10:1, more preferred between 1:4 and 4:1, most preferred between 2:3 and 3:2.

The microcapsules according to the invention are stable in storage after drying for at least 14 days, preferably for at least 28 days, particularly preferably for at least 36 days at storage temperatures from 20 to 40° C. and at a relative air humidity of 30 to 70%.

The advantageous properties of the microcapsules according to the invention can also be proofed by stability/storage tests. Preferably, the microcapsules according to the invention withstand even harsh conditions like a standard softener composition and a temperature of 40° C.

In the most preferred embodiment, the microcapsules according to the invention comprise a shell and a core material, wherein the shell is a coacervate of gum arabic, and chitosan, crosslinked with glutaraldehyde and phloroglucinol, and the core material comprises at least one hydrophobic ingredient.

The present invention also relates to the use of microcapsules obtained or obtainable by the invention or to composition and products comprising them. Such compositions or products may be either solid or liquid product. According to a particular embodiment, liquid products are preferred. Preferred products and composition are used in the "home- or personal-care" industry, e.g. laundry or cleansing compositions. An agent composition for washing, cleaning, conditioning, caring for and/or dyeing, comprising the microcapsules according to the invention is also disclosed.

In a preferred embodiment an agent composition washing, cleaning, conditioning, caring and/or dyeing, comprising the microcapsules obtained by a method according to the invention is disclosed.

The invention will now be further described by way of examples. It will be appreciated that the invention as claimed is not intended to be limited in any way by these examples.

PARTICULARLY PROFFERED EMBODIMENTS OF THE INVENTION

In the following particular embodiments of the invention are described.

In general, the invention relates to a method for producing microcapsules comprising core material and shell comprising the following steps,
- a) adding at least one crosslinking agent to a composition comprising at least one first solubilised polyelectrolyte (polyelectrolyte A),
- b) adding the core material,
- c) optionally adding at least one further solubilised poly-electrolyte A,
- d) optionally cooling the composition,
- e) adding at least one second solubilised polyelectrolyte (polyelectrolyte B),
- f) fostering a coacervation of the polyelectrolytes.

The polyelectrolyte A can be an anionic polyelectrolyte and the polyelectrolyte B is a cationic or amphoteric poly-electrolyte.

The polyelectrolyte A preferably is selected from the group consisting of gum arabic, sodium carboxymethyl guar gum, plant gums, pectin, glycogen, cellulose (in particular carboxymethyl cellulose), alginate, starch (e.g. amylose or amylopectin), hyaluronic acid, tannins, carrageenan, lignin sulfonate or xanthan gum or mixtures thereof, preferably gum arabic, pectin, carboxymethyl cellulose, or gum arabic and carboxymethyl cellulose, most preferably gum arabic.

The polyelectrolyte B is preferably selected from the group consisting of chitosan, gelatine, casein, plant proteins (e.g. soy protein isolate), egg white protein, chitin, or silk protein or mixtures thereof, is preferably chitosan, gelatin or soy protein isolate, most preferably chitosan.

The polyelectrolyte A in step a) preferably comprises gum arabic.

The polyelectrolyte A in step a) preferably is gum arabic and carboxymethyl cellulose.

The polyelectrolyte A in step c) is preferably of gum arabic.

The polyelectrolyte B in step e) is preferably chitosan.

Preferably the polyelectrolyte A in step a) is gum arabic and carboxymethyl cellulose, the polyelectrolyte A in step c) is gum arabic, and the polyelectrolyte B in step e) is chitosan.

The amount of polyelectrolyte A added in step c) can be equal to or exceed the amount of polyelectrolyte A added in step a).

The weight ratio between polyelectrolyte A added in step a) and the polyelectrolyte step c) is preferably 1:1-1:30, more preferably 1:2-1:15, even more preferably 1:3-1:10, most preferably 1:4-1:7.

The weight ratio between the polyelectrolyte A used in step a) and the crosslinking agent is preferably 1:8-8:1, more preferably 1:5-5:1, even more preferably 1:3-3:1, most preferably 2:3-3:2.

The weight ratio between total amounts of polyelectrolytes to crosslinking agent is preferably 1:1-50:1, more preferably 2:1-25:1, even more preferably 4:1-18:1, most preferably 6:1-13:1.

The crosslinking agent can comprise an aldehydic compound, preferably a dialdehyde.

The crosslinking agent can be a dialdehyde selected from the group consisting of succindialdehyde, adipaldehyde, glutaraldehyde, glyoxal, glyoxylic acid, malondialdehyde, oleocanthal, or mixtures thereof, preferably glutaraldehyde.

The crosslinking agent is preferably selected from the group consisting of a dialdehyde and a reaction product of a dialdehyde with an aromatic alcohol, which is preferably a diol, more preferably a triol.

The aromatic alcohol can be selected from the group of phenol, cresol (o-, m-, p-cresol), naphthol (1-, 2-naphthol), pyrocatechol, resorcinol, hydroquinone, 1,4-naphthohydro-quinone, phloroglucinol, pyrogallol, hydroxyquinol, ben-zene-1,2,3,5-tetrol, or mixtures thereof, preferably resorci-nol or phloroglucinol.

The crosslinking agent preferably can comprise a reaction product of glutaraldehyde with an aromatic alcohol, which is preferably resorcinol or phloroglucinol.

Preferably the dialdehyde is added in step a) to a composition comprising polyelectrolyte A and at least one aromatic alcohol.

Preferably the aldehydic compound is added in excess to the aromatic alcohol.

The ratio of aromatic alcohol to aldehydic compound is preferably 0.5:1-1:20, more preferably 1:1-1:10, most preferably 1:1-1:6.

In step a) a thickener can be added, which is preferably a polyelectrolyte, more preferably an anionic polyelectrolyte, most preferably carboxymethyl cellulose.

The temperature of the composition in step a) is preferably between 20-80° C., more preferably 30-75° C., more preferably 35-70° C., most preferably 50-65° C.

The reaction time of step a) is preferably less than 90 min, more preferably less than 60 min, most preferably less than 30 min.

The temperature of the composition in step b) is preferably between 20-80° C., more preferably 30-75° C., even more preferably 35-70° C., most preferably 50-65° C.

The composition in step b) is kept at the reaction temperature for 5-180 min, preferably 30-120 min, most preferably 55-95 min after an emulsion has formed and before the next step is initiated.

The temperature of the composition in step c) is preferably between 20-80° C., more preferably 30-75° C., even more preferably 35-70° C., most preferably 50-65° C.

The reaction time in step c) is preferably 5-90 min, more preferably 15-60 min, most preferably 20-40 min.

The polyelectrolyte A in step c) can be added at once or over the course of the reaction time, preferably the poly-electrolyte A is added over the course of the reaction time.

The step d) is preferably carried out.

The temperature of the composition in step d) is preferably 0-30° C., more preferably 0-20° C., most preferably 0-10° C.

The temperature of the composition in step e) is preferably kept at the temperature from step d).

The temperature of the composition in step f) is preferably 0-30° C., more preferably 0-20° C., most preferably 0-10° C.

The temperature of the composition is preferably 20-80° C. from step a) to step c), and 0-20° C. from step d) to step f).

The method can comprise a further step g) of heating the composition from step f).

The temperature of the composition in step g) is preferably between 35 and 95° C., preferably 40-85° C., more preferably 45-75° C., most preferably 50-65° C.

The reaction time of step g) is preferably 5-420 min, preferably 60-240 min, most preferably 90-150 min.

An agglomeration inhibiting additive can be added to the mixture in step g).

The agglomeration inhibiting additive can be a solubilised polyelectrolyte A.

Preferably the polyelectrolyte in step e) is chitosan and the agglomeration inhibiting agent in step g) is gum arabic.

The composition after step g) can be adapted to a pH value of 6.0-7.8, preferably 6.3-7.5, most preferably 6.5-7.3.

Most preferably the core material comprises a hydrophobic ingredient.

The core material can be selected from the group consisting of alcohols, natural and/or synthetic oils, silicone oils, or mixtures thereof.

The core material can be selected from the group consisting of perfume oils, care substances, pesticides, biocides, pigments, phase change materials (PCM), fertilisers, adhesives, insecticides, solvents, lubricants, dyes, cooling substances, or mixtures thereof.

The method can comprise a further step h) of drying the slurry obtained in the step f) or step g).

The microcapsules of the invention preferably have a hydrodynamic diameter d(90%) between 5 and 150 μm, preferred between 5 and 120 μm, more preferred between 10 and 50 μm, with a standard deviation of ±50%.

The microcapsules preferably have a shell obtained from crosslinking at least two bio-based polyelectrolytes with a crosslinking agent comprising a dialdehyde and an aromatic alcohol.

The microcapsules preferably are at least 30%, at least 40%, preferably at least 50%, more preferably at least 60%, most preferably at least 70% biodegradable after 60 days measured in a test according to OECD test 301 B. They are particularly suitable as a component for washing, cleaning, conditioning, caring and/or dyeing compositions.

EXAMPLES

Unless otherwise indicated or described, all mentioned sizes or size distributions of the microcapsules refer to the measuring method using Dynamic Light Scattering (DLS). The measurements were performed in deionized water (refractive index: 1.333) at room temperature (25° C.) with a RETSCH® Partica Laser Scattering Particle Size Distribution Analyzer LA-950V2. The pictures of the micro capsules were taken with the microscope NIKON Eclipse LV100 equipped for UV-microscopy. For TGA measurements (thermal analysis) a PerkinElmer® Thermogravimetic Analyzer T8000 was used.

Example 1a—Microcapsules Gum Arabic (GA) and Carboxymethyl Cellulose (CMC)-GA-Chitosan (Chi)

The process of microencapsulation of a hydrophobic substance based on an emulsion process, including the coacervation of at least two oppositely charged polyelectrolytes, according to the invention can be described in five steps:

1. Crosslinking of the Solubilised Electrolytes:
   5 g of gum arabic and 0.5 to 3 g of carboxymethyl cellulose are dissolved together with 1.5 to 3 g phloroglucinol in 250 mL of water and 4 to 5 g glutaraldehyde and the pH is adjusted with formic acid to 3.3 to 3.6, which is between the pKa values of the polyanions. Unless mentioned otherwise the temperature is kept at 60° C.

2. Emulsification of the Hydrophobic Substance:
   After 10 minutes the core material to be coated is added to the polyelectrolyte solution by means of a stirrer without additional emulsifiers. The stirring speed is adjusted according to the desired capsule size and on the core material. After achieving the desired capsule size, the stirring speed is reduced back to the initial speed.

The core/shell ratio is preferably between 2:3 and 3:2.
3. Growing of the Shell:
   After 90 minutes, 30 to 35 g of gum arabic solubilized in 100 mL water are added to the composition.
4. Cooling of the Composition, Growing of the Shell, Coacervation
   After 30 minutes, the solution can optionally be cooled down from 60° C. to 5-10° C. After 30 minutes, 6 to 9 g of chitosan in 95 to 125 mL of 0.3 M HCl is added over the course of 30 minutes. The pH value is adjusted into a region at which coacervation occurs, in this example 3.2 to 3.8.
5. Further Crosslinking of the Shell:
   The shell can optionally be further hardened by heating the composition to 60° C. To avoid agglomeration, 2 to 5 g of gum arabic in 6 to 15 mL water can be added to the composition. After 60 to 150 minutes, the composition is cooled to room temperature and (optionally) the pH value is adjusted to 6 to 7.

The influence of the degree of crosslinking on the microcapsule sizes are portrayed as optical microscopy photographs and DLS measurements in FIG. 1 to 14. As can be seen, the degree of crosslinking does not significantly influence the sizes of microcapsules produced with a method according to the invention.

Figure 15:
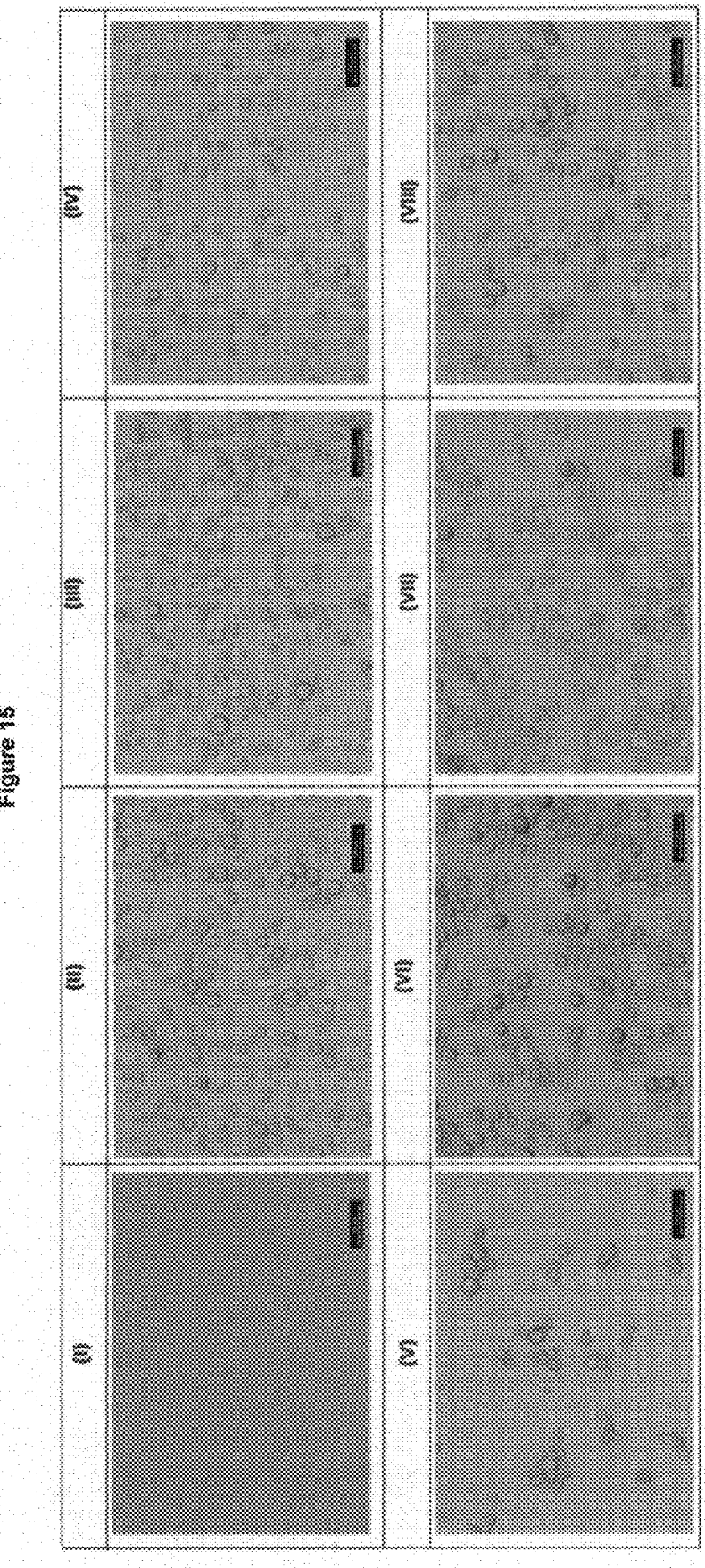
FIG. 15 is a series of microscopic images of the composition during different stages of the method according to the invention produced by a method according to the invention; (I) after mixing solubilised polyelectrolyte and crosslinking agent, (II) after core material was emulsified, (Ill) at the end of emulsification before more polyelectrolyte was added, (IV) after more polyelectrolyte had been added and while the composition was cooled down, (V) agglomeration after coacervation, (VI) after agglomeration-inhibiting agent was added and while heating up, (VII) during crosslinking, (VIII) after crosslinking was completed and the composition was back at room temperature.

A visualisation of the steps is provided in FIG. 15. FIG. 15(I) shows an image of the solubilised polyelectrolyte after addition of the crosslinking agent in step a). FIG. 15 (II) shows that an emulsion is formed after core material was added in step b). FIG. 15 (III) shows the composition before step c) is initiated; even without rapid stirring the emulsion remains intact and no phase separation is observed. FIG. 15 (IV) shows the composition during step d), while the composition is cooled; no major changes are observed compared to the previous step. FIG. 15(V) shows the composition after the polyelectrolyte in step e) was added and coacervation in step f) was finished; the microcapsules have agglomerated. FIG. 15 (VI) shows the composition after an agglomeration inhibiting agent had been added and heating up is initiated at the beginning of step g); the microcapsules are less agglomerated. FIG. 15 (VII) shows the composition after the target temperature was reached in step f); the microcapsules are even less agglomerated. FIG. 15 (VIII) shows the composition after the end of step f); the microcapsules are largely discrete. From FIG. 15 (II) to (VIII) no major changes in microcapsule diameter are observed.

Both the use of other polyelectrolytes (and combinations thereof) and alternative crosslinking agents are included in the disclosure of this invention.

Example 1b—Microcapsules with Different Degree of Crosslinking

Microcapsules 1 to 3 were produced according to the method described above in Example 1a with varying ingredients and degrees of crosslinking.

TABLE 1

| | Relationship of microcapsule shell stability and reagent ratios. | | |
|---|---|---|---|
| Shell stability | Aromatic alcohol: Aldehyde | polycation: polyanion | Crosslinking agent: polyelectrolytes |
| Very low | 0 | 1:5.4 | 1:18 |
| Low | 1:3 to 1:8 | 1:5.5 | 1:13 |
| Medium | 1:2 to 1:3 | 1:5.5 | 1:10 |
| High | 1:1 to 1:2 | 1:5.5 | 1:7 |

Example 2—Leakage Test

Figure 16:
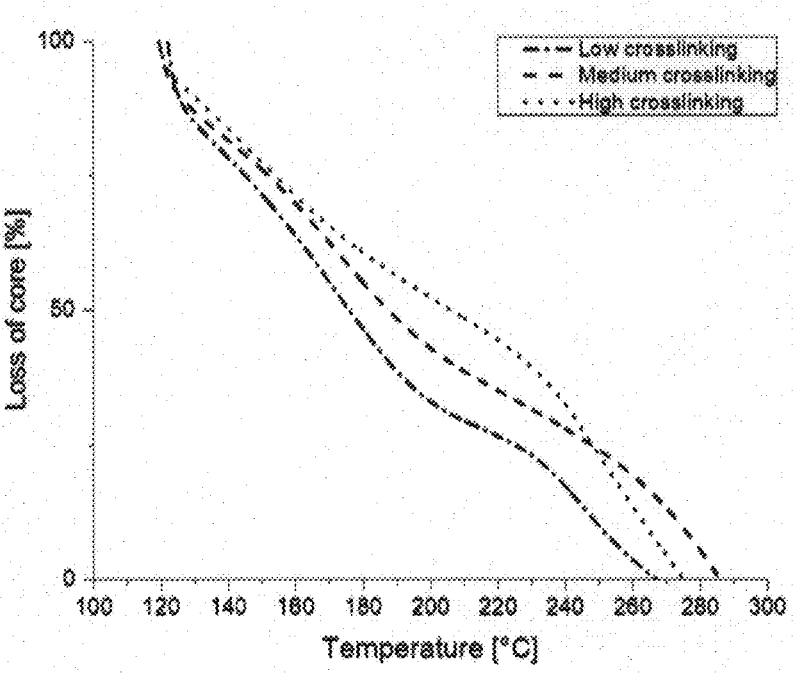
FIG. 16 is a graphic showing the results of a thermal analysis of microcapsules from the comparative test showing core material loss as a function of temperature microcapsules with a low, medium, and high degree of crosslinking, encapsulating a fragrance oil.

A thermal analysis of the capsules produced was performed. The aim was to determine differences in tightness/leakage. The test temperature program was the following: 1.) Holding for 1.0 min at 30.00° C., 2.) Heat from 30.00° C. to 90.00° C. at 5.00° C./min, 3.) Heat from 90.00° C. to 500.00° C. at 10.00° C./min—Purging gas was nitrogen with a purge gas rate of 20.0 mL/min. Three probes were analyzed: microcapsules according to a method according to the invention with a low, medium, and high degree of crosslinking (see FIG. 9 to 14), loaded with fragrance oil 3 (DÖ3). Considering the theoretical loading of the capsules, core material loss can be represented as a function of temperature: FIG. 16 shows the curves of loss of core material for the microcapsules due to the increase of temperature. A higher degree of crosslinking is clearly benefits the stability of the microcapsule.

Example 3—Capsule Resistance in Softener

The aim of this test was to determine the capsule resistance in softener. Therefore two different observation/testing methods were used.

I. Sensory Panel

In a sensory panel of three independent test persons microcapsules according to the invention were presented to detected an odour resulting from a leakage of the core material (fragrance oils, coloured with Coumarin 1). In a range from 0 (no odour detected) to 5 (very strong odour detected) the test person rates the olfactory impression of the presented capsules. Microcapsules according to the invention with a high degree of crosslinking (R15-C12-05), wherein the crosslinking agent comprises a dialdehyde and an aromatic alcohol, were tested with three different kinds of fragrance oils (DÖ). The microcapsules were tested at day 0 of storage before and after rubbing as well as after a 14-days storage period in a standard softener (purchased from Henkel) at a pH of 3.0 and 40° C. before and after rubbing. The results are presented in Table 1 and FIG. 17.

TABLE 2

| results from the sensory panel at day 0 and after 14 days of storage at 40° C. (before and after rubbing) of microcapsules with different fragrance oils (DÖ) according to the invention. | | | | | |
|---|---|---|---|---|---|
| | Day 0 | | | | |
| | R15-C12-05 DÖ1 | | R15-C12-05 DÖ2 | | R15-C12-05 DÖ3 |
| | before rubbing | after rubbing | before rubbing | after rubbing | before rubbing | after rubbing |
| Ø | 1.3 | 4.2 | 1.7 | 3.7 | 0.0 | 3.0 |
| s | 0.5 | 0.2 | 0.5 | 0.5 | 0.0 | 0.0 |

TABLE 2-continued

| results from the sensory panel at day 0 and after 14 days of storage at 40° C. (before and after rubbing) of microcapsules with different fragrance oils (DÖ) according to the invention. | | | | | |
|---|---|---|---|---|---|
| Proband 1 | 1 | 4 | 2 | 4 | 0 | 3 |
| Proband 2 | 1 | 4 | 2 | 3 | 0 | 3 |
| Proband 3 | 2 | 4.5 | 1 | 4 | 0 | 3 |

| | Day 14 | | | | |
|---|---|---|---|---|---|
| | R15-C12-05 DÖ1 | | R15-C12-05 DÖ2 | | R15-C12-05 DÖ3 |
| | before rubbing | after rubbing | before rubbing | after rubbing | before rubbing | after rubbing |
| Ø | 1.0 | 3.0 | 1.3 | 4.2 | 0.7 | 3.3 |
| s | 0.0 | 0.0 | 0.5 | 0.2 | 0.5 | 0.5 |
| Proband 1 | 1 | 3 | 1 | 4 | 1 | 3 |
| Proband 2 | 1 | 3 | 1 | 4 | 0 | 3 |
| Proband 3 | 1 | 3 | 2 | 4.5 | 1 | 4 |

The results show no odour or a very light odour at day 0 before rubbing the capsules. After rubbing them an olfactory boost of fragrance can be detected. No significant performance differences occurs after a 14-days storage period at 40° C. in a standard softener composition (pH=3.0). After rubbing the stored capsules they still show a strong odour even after these harsh conditions. Furthermore, no significant difference is observed in sensory tests after 1 or 3 days of drying.

II. Microscopy

Figure 17:
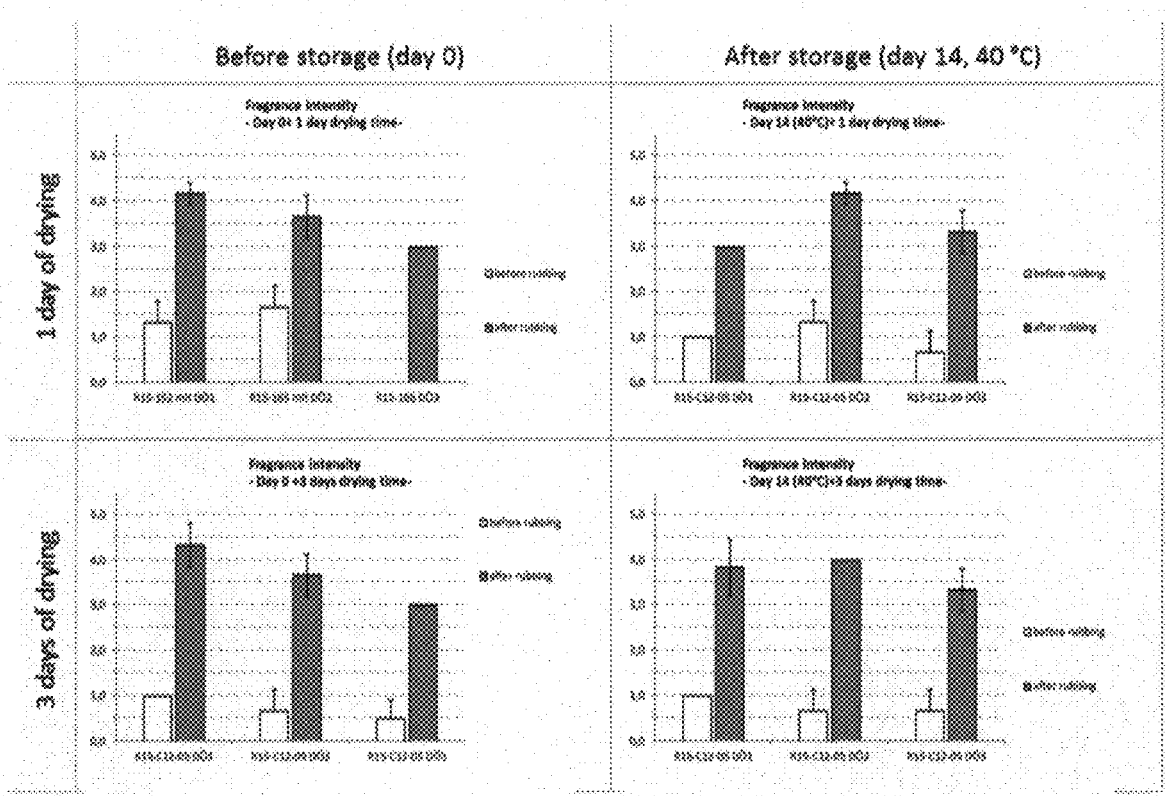
FIG. 17 are bar chart results from the sensory panel at day 0 and after 14 days of storage in fabric softener (purchased from Henkel, pH=3.0) at 40° C. (before and after rubbing) and 1 or 3 days of drying for microcapsules according to the invention with a high degree of crosslinking (R15-C12-05) and three different fragrance oils (DÖ) as core materials.
Figure 18:
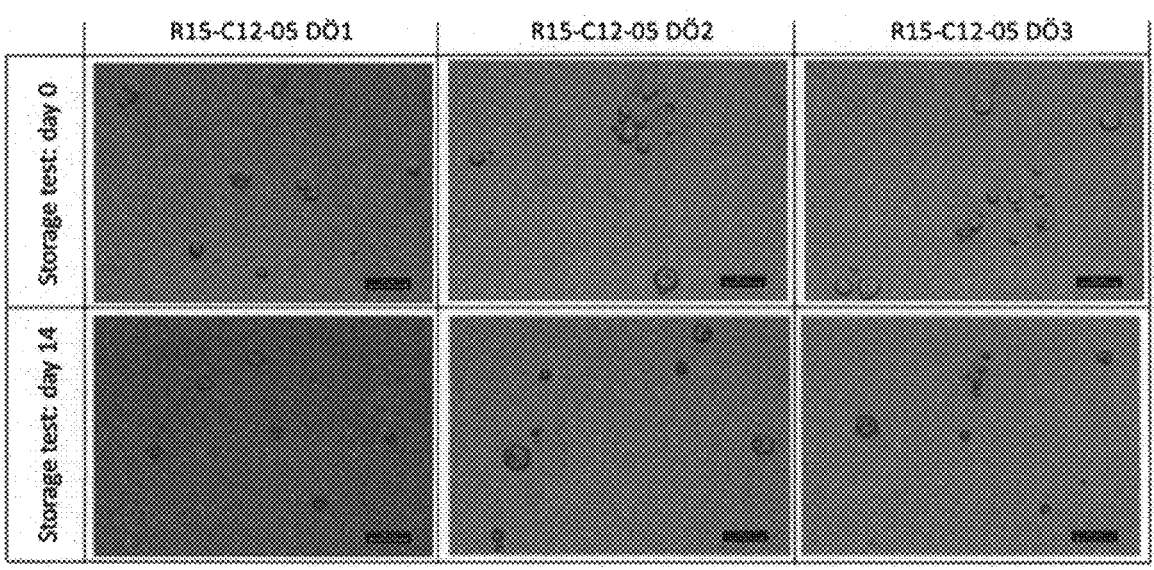
FIG. 18 are UV-microscopy images at day 0 and after 14 days of storage in fabric softener (purchased from Henkel, pH=3.0) at 40° C. (before and after rubbing) and 1 or 3 days of drying for microcapsules according to the invention with a high degree of crosslinking (R15-C12-05) and three different fragrance oils (DÖ) coloured by the addition of Coumarin 1 as core materials. The images show no loss/leakage of core material. The microcapsules according to the invention are stable and leak-proof, even after harsh storage conditions.

For an independent optical determination of these capsules, they were examined under a UV-Microscopy (NIKON Eclipse LV100). Due to the fact, that Coumarin 1 (blueish color) was encapsulated together with the fragrance oil. It was possible to prove the (storage) stability, even in harsh conditions, of the microcapsules according to the invention. In FIG. 17 microcapsules of R15-C12-05 are shown after 0 and 14 days of storage at 40° C. in a standard softener composition (pH=3.0). The blueish colour of the encapsulated Coumarin 1 is clearly visible inside intact microcapsules. No leakage can be detected.

Example 4—Biodegradability

Biodegradability was measured according to the method in OECD test 301 B (OECD (1992), Test No. 301: Ready Biodegradability, OECD Guidelines for the Testing of Chemicals, Section 3, OECD Publishing, Paris, https://doi.org/10.1787/9789264070349-en).

The principle of the test is summarised in the following: A measured volume of inoculated mineral medium, containing a known concentration of the test substance (10-20 mg DOC or TOC/L) as the nominal sole source of organic carbon is aerated by the passage of carbon dioxide-free air at a controlled rate in the dark or in diffuse light. Degradation is followed over 60 days by determining the carbon dioxide produced. The $CO_2$ is trapped in barium or sodium hydroxide and is measured by titration of the residual hydroxide or as inorganic carbon. The amount of carbon dioxide produced from the test substance (corrected for that derived from the blank inoculum) is expressed as a percentage of $ThCO_2$. The degree of biodegradation may also be calculated from supplemental DOC analysis made at the beginning and end of incubation. Where DOC, TOC, and $ThCO_2$ are the dissolved organic carbon, total organic carbon, and theoretical maximum $CO_2$, respectively.

Microcapsules obtained by a procedure according to Example 1 with a high degree of crosslinking (R15-C12-05) were tested in duplicate (test solution 1 and 2). Sodium benzoate was used as a reference compound with a concentration of 20 mg/L TOC. The inoculum was Filtrate of homogenised activated sludge from the waste-water treatment plant at Taunusstein Bleidenstadt (Lot-No.: Mar. 8, 2021). The toxicity control contains the test substance, reference compound and inoculum.

Figure 19:
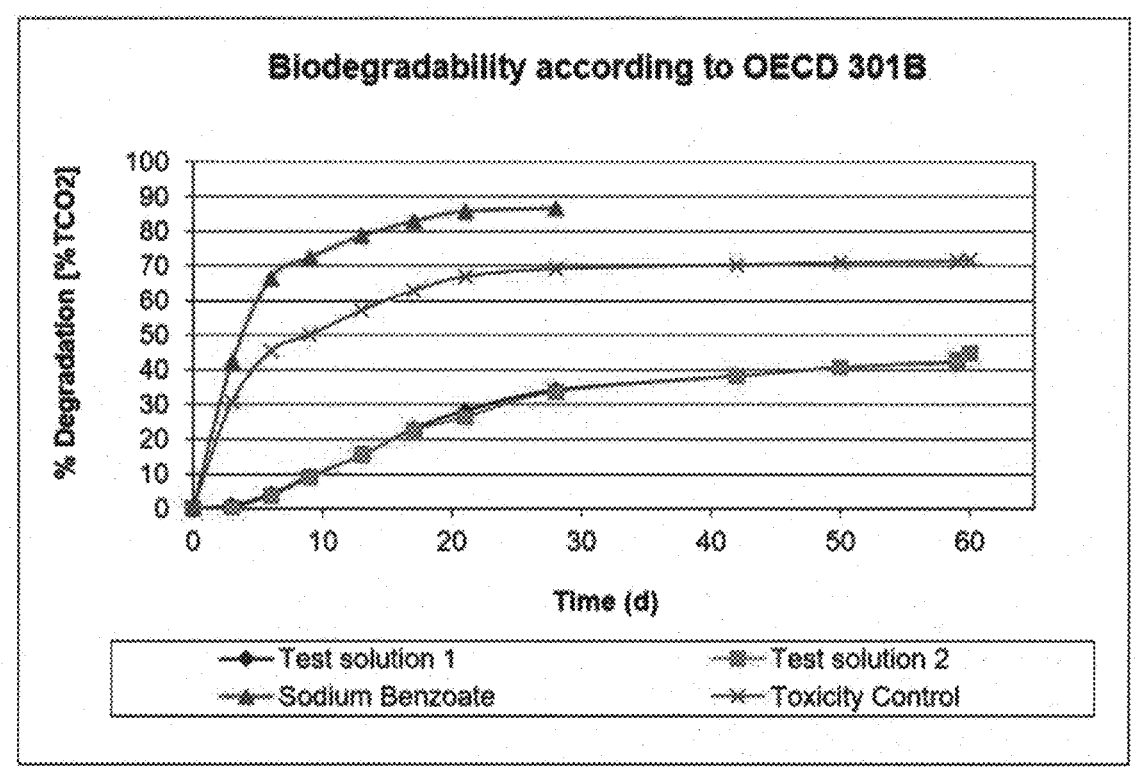
FIG. 19 shows the biodegradability of a microcapsule obtained with a method according to the invention with a high degree of crosslinking (R15-C12-05); measured according to the method of OECD test 301 B. After 60 days approximately 45% of the theoretical amount of maximum $CO_2$ ($ThCO_2$) has evolved.

The results of the test are shown in FIG. 19. As can be seen, the degradation of the microcapsules R15-C12-05 reaches 40% $ThCO_2$ within 50 days and reaches up to 45% $ThCO_2$ at 60 days.

The invention claimed is:

1. Method for producing microcapsules comprising a core material and a shell comprising the following steps,
   a) adding at least one crosslinking agent to a composition comprising at least one first solubilised polyelectrolyte (polyelectrolyte A),
   b) then adding the core material,
   c) optionally adding at least one further solubilised polyelectrolyte A,
   d) then optionally cooling the composition,
   e) adding at least one second solubilised polyelectrolyte (polyelectrolyte B) in a next step,
   f) then fostering a coacervation of the polyelectrolytes, wherein the polyelectrolyte A is an anionic polyelectrolyte and polyelectrolyte B is a cationic or amphoteric polyelectrolyte.

2. Method according to claim 1, characterised in that the polyelectrolyte A is selected from the group consisting of gum arabic, sodium carboxymethyl guar gum, plant gums, pectin, glycogen, cellulose, carboxymethyl cellulose, alginate, starch, amylose, amylopectin, hyaluronic acid, tannins, carrageenan, lignin sulfonate xanthan gum, and mixtures thereof.

3. Method according to claim 1, characterised in that polyelectrolyte B is selected from the group consisting of chitosan, gelatin, casein, plant proteins, soy protein isolate, egg white protein, chitin, silk protein, and mixtures thereof.

4. Method according to claim 1, characterised in that the composition of step a) comprises gum arabic and carboxymethyl cellulose, the polyelectrolyte added in step c) is gum arabic, and the polyelectrolyte added in step e) is chitosan.

5. Method according to claim 1, characterised in that the weight ratio between the polyelectrolyte in the composition of step a) and the polyelectrolyte added in step c) is 1:1-1:30.

6. Method according to claim 1, characterised in that the weight ratio between the polyelectrolyte in the composition of step a) and the crosslinking agent is 1:8-8:1.

7. Method according to claim 1, characterised in that the weight ratio between total amounts of polyelectrolytes to crosslinking agent is 1:1-50:1.

8. Method according to claim 1, characterised in that the crosslinking agent is selected from the group consisting of a dialdehyde and a reaction product of a dialdehyde with an aromatic alcohol.

9. Method according to claim 1, characterised in that the crosslinking agent is selected from the group consisting of succindialdehyde, adipaldehyde, glutaraldehyde, glyoxal, glyoxylic acid, malondialdehyde, oleocanthal, and mixtures thereof, or is a reaction product of a dialdehyde with an aromatic alcohol selected from the group consisting of phenol, cresol (o-, m-, p-cresol), naphthol (1-, 2-naphthol), pyrocatechol, resorcinol, hydroquinone, 1,4-naphthohydroquinone, phloroglucinol, pyrogallol, hydroxyquinol, benzene-1,2,3,5-tetrol, and mixtures thereof.

10. Method according to claim 1, characterised in that the crosslinking agent is a reaction product of glutaraldehyde with resorcinol or phloroglucinol.

11. Method according to claim 8, characterised in that the dialdehyde is added in step a) to a composition comprising the polyelectrolyte A and at least one aromatic alcohol.

12. Method according to claim 8, characterised in that the ratio of the aromatic alcohol to the dialdehyde is 0.5:1-1:20.

13. Method according to claim 1, characterised in that the composition of step a) comprises a thickener.

14. Method according to claim 1, characterised in that the temperature of the compositions of step a) to step c) is between 20-80° C. and the temperature of the compositions od step e) to f) is between 0-20° C.

15. Method according to claim 1, characterised in that it comprises heating the composition from step f) to 35-95° C. (step g).

16. Method according to claim 1, characterised in that core material comprises a hydrophobic ingredient.

17. Method according to claim 1, characterised in that it comprises drying the composition obtained in step f) or step g).

18. Microcapsules obtained or obtainable by a method according to claim 1.

19. Microcapsule with a shell obtained or obtainable by crosslinking at least two polyelectrolytes with a reaction product from a dialdehyde and an aromatic alcohol.

20. Microcapsule according to claim 17, characterised in that the shell is composed of biodegradable polyelectrolytes and/or that the microcapsule has a biodegradability after 60 days of at least 40% measured according to OECD 301 B.

21. A composition comprising the microcapsules according to claim 17, for washing, cleaning, conditioning, caring and/or dyeing.

22. Method according to claim 1, characterised in that the core material is selected from alcohols, natural and/or synthetic oils, silicone oils or mixtures thereof.

* * * * *